United States Patent Office 3,164,612
Patented Jan. 5, 1965

---

3,164,612
PROCESS FOR PREPARING ALPHA-CHLOROALDEHYDES AND ALPHA-CHLOROKETONES
Walter Fink, Zurich, Switzerland, assignor to Monsanto Company, a corporation of Delaware
No Drawing. Filed May 28, 1962, Ser. No. 197,872
7 Claims. (Cl. 260—340)

The present invention relates to a novel process for preparing alpha-chloroaldehydes and alpha-chloroketones having the general formula

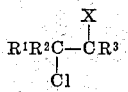

In this formula $R^1$, $R^2$ and $R^3$ are hydrogen atoms, or identical or different hydrocarbon radicals, which can be substituted, and $R^1$ can also be a halogen atom. The radicals $R^2$ and $R^3$ taken together can also form a cyclic structure, such as a 5 to 8 carbon aliphatic ring. Normally, but not necessarily, $R^1$, $R^2$ and $R^3$, if hydrocarbon, will have not more than 18 carbon atoms, more preferabbly not more than 8 carbon atoms.

The alpha-chloroaldehydes and alpha-chloro-ketones defined above are obtained according to the novel process on the treatment of certain organic chloronitrates by a strong Lewis acid. These organic chloronitrates serving as starting compounds have the general formula

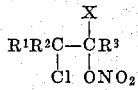

wherein $R^1$, $R^2$ and $R^3$ have the same significance as above and X represents a halogen atom, preferably a chlorine or fluorine atom.

The decomposition of the starting compound on the treatment by a strong Lewis acid, for example, by $SnCl_4$, occurs according to the scheme

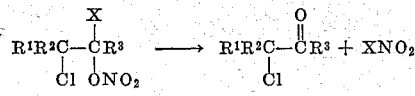

Depending on whether $R^3$ is a hydrogen atom or an organic radical, aldehydes or ketones are formed with good yields of about 75–100%.

The number of aldehydes and ketones which can be manufactured according to this new process is very large, conforming to the availability of the starting compounds. The halogen nitrates necessary in carrying out the invention are not yet described in the literature of the art. They are obtained by reacting chloronitrates ($ClNO_3$) and olefines, which possess a halogen atom attached to an olefinically bonded carbon atom and have the following formula

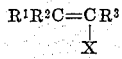

or contain such a grouping.

On the reaction of these olefines and chloronitrate, the latter is added to the ethylenic double bond in such a manner that the nitrate group joins the carbon atom attached to X, and the starting compounds described hereinabove are formed.

Now, it is apparent that because of the preparation from certain halogenated olefines and chloronitrate, the starting compounds always have, in addition to the halogen atom originally present, a chlorine atom which was introduced by the chloronitrate and which remains in the alpha-position to the formed carbonyl group upon the conversion of the starting compounds into aldehydes and ketones.

The chloronitrate needed for the reaction can be obtained quantitatively, for example, by reacting nitrogen pentoxide and chlorine monoxide at low temperature according to the following equation:

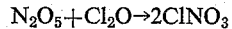

(M. Schmeisser, W. Fink, K. Brändle, Angew. Chem. 69, 780, 1957). The addition of chloronitrate to olefins is described in co-pending application S.N. 62,881, filed October 17, 1960. The simplest, for example, only chlorine containing starting compounds are

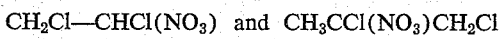

which can be converted according to the novel method into the corresponding alpha-chloroaldehyde

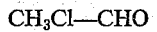

or alpha-chloroketone $CH_3COCH_2Cl$, respectively.

In the preparation of the starting compounds, at least one olefinically bonded carbon atom should possess only one halogen atom. If there is no halogen atom present, the reaction does not proceed uniformly on the treatment of such organic nitrates by a strong Lewis acid and a variety of different endproducts result. (R. Boschon, A. Landis, J. Org. Chem. 25, 2012, 1960). If there are two halogen atoms present—a terminal carbon atom only qualifies for this possibility—the corresponding alpha-chlorocarbonic acid halide instead of an alpha-chloroaldehyde is formed.

It is clear that the starting compounds can contain more than one grouping $—CHX(NO_3)$ or $—CR^3X(NO_3)$ responsible for the reaction, and that more than one aldehyde and, or respectively, ketone group can be made upon treatment by a strong Lewis acid. Thus, from 1,5-dinitrato-1,2,4,5-tetrachloropropane which is obtainable from 1,5-dichloropropadiene-1,4 and chloronitrate, the corresponding dialdehyde, namely 2,4-dichloropropane-1, 5-dial arises. Diketones, triketones, etc., or ketoaldehydes can be prepared in like manner.

A simple example in which $R^2$ and $R^3$ taken together form a cyclic structure is 1-nitrato-1,2-dichlorocyclohexane, which is obtainable from 1-chlorocyclohexene and chloronitrate and is converted into 2-chlorocyclohexanone upon the treatment by a strong Lewis acid.

As mentioned previously, the substituents $R^1$, $R^2$ and/or $R^3$ when they are organic radicals, can bear substituents such as, for example, halogen or nitrate, nitrite, sulfate, alkoxy, keto, aldehyde, carboxy, carboxylate, carbonic acid halide, nitro, cyano, sulfo groups, etc., to the extent that such compounds can be made from the correspondingly substituted olefines and multi-unsaturated olefines and chloronitrate.

The defined starting compounds can be decomposed by a strong Lewis acid with or without using a solvent. A catalytic amount of Lewis acid is sufficient, i.e., of the order of 1% by weight or less based on the chloronitrate; however, of the order of an equimolar amount or more can be used. Solvents which are appropriate are nonreactive with the aldehydes or ketones, as well as towards the Lewis acid and the by-product chloronitrite ($ClNO_2$). Suitable solvents are, for example, hexane, carbon tetrachloride, frigenes, etc. When no solvent is used, it may be desirable to use a greater amount, for example, an equimolar amount of the Lewis acid catalyst in the reaction, because the adducts which are formed with the chloronitrite like, for example, the adduct with $SnCl_4$, are volatile and can escape, or sublime off, from the reaction mixture.

Any strong Lewis acid such as, for example, $BCl_3$, $BF_3$, $SnCl_4$, $AlCl_3$, $AlF_3$, etc., is suitable for the catalysis of the reaction. The process is preferably conducted at about room temperature, i.e. at 15–30° C. If necessary, one can also work at lower or higher temperatures. In the preferred method after the reaction is completed, the reaction mixture is separated by distillation, if necessary under reduced pressure.

The chloronitrite by-product can be oxidized and used for the preparation of further starting material, and the process becomes more economical for that reason. In another feature the end-products are freed from the catalyst and chloronitrite by washing with water. According to the working technique employed and to the kind of aldehydes formed, the aldehydes can be obtained in form of hydrates, monomers, trimers or polymers.

*Example 1*

15.6 g. (0.097 mole) of $CH_2ClCHCl(NO_3)$ are mixed with 1.13 ml. (2.56 g., 0.097 mole) of $SnCl_4$ at 22° C. and stirred for 1-2 hours at this temperature.

Then the reaction mixture is distilled at 40° C./$10^{-2}$ mm., whereby $SnCl_4$ and $SnCl_4 \cdot NO_2Cl$ escape. The remaining residue crystallizes spontaneously and consists substantially of trimeric chloroacetaldehyde (2,4,6-trichloromethyl-1,3,5-trioxane). Yield 92-98%; 140-144° C./10 mm.; M.P. (after recrystallization) 88-89° C.

| Analysis | Percent | Calc'd | Found |
|---|---|---|---|
| $C_2H_3OCl$ | C | 30.61 | 30.46 |
| | H | 3.85 | 3.90 |
| | Cl | 45.16 | 44.97 |

*Example 2*

12 g. (0.069 mole) of $CH_3CHClCHCl(NO_3)$ are mixed with 1 ml. (2.23 g., 0.085 mole) of $SnCl_4$. Water and ice is added after 2 hours to the reaction mixture, which is extracted with ether. The ether solution is fractionated after it is dried with sodium sulfate. Yield 78%; B.P. 78-80° C./728 mm. As can be concluded from analysis and properties, the compound is substantially alpha-chloropropionaldehyde hydrate (B.P. 81-85° C./760 mm.). The product becomes solid after being kept over $P_2O_5$ for 6 days; M.P. 170-180° C.

What is claimed is:

1. A process for preparing alpha-chloroaldehydes and alpha-chloroketones of the formula $R^1R^2CClC(O)R^3$ wherein $R^1$ is selected from the class consisting of the hydrogen atom, halogen atoms and alkyl having not more than 8 carbon atoms and $R^2$ and $R^3$ are selected from the class consisting of cycloalkyl having from 5 to 8 carbon atoms in the ring when taken together and when taken singly hydrogen atoms and alkyl having not more than 8 carbon atoms, comprising contacting a chloronitrate of the formula $R^1R^2CClCX(ONO_2)R^3$ wherein $R^1$, $R^2$ and $R^3$ are as defined hereinabove and X is a halogen atom with at least a catalytic amount of a strong Lewis acid.

2. A process of claim 1 carried out in the presence of an inert liquid solvent.

3. A process of claim 1 wherein said Lewis acid is present in at least about an equal molar amount to said chloronitrate.

4. A process of claim 1 wherein said Lewis acid is $SnCl_4$.

5. A process of claim 1 wherein X is the chlorine atom, $R^1$ is alkyl having not more than 8 carbon atoms, and $R^2$ and $R^3$ are hydrogen atoms, said Lewis acid is $SnCl_4$, the temperature at which the process is carried out is between about 15° and 30° C., and at least about an equal molar amount of $SnCl_4$ to said chloronitrate is used.

6. A process of claim 1 wherein said chloronitrate is 1-nitrato-1,2-dichloroethane, said Lewis acid is $SnCl_4$ which is used in at least about an equal molar amount to said chloronitrate, and the temperature at which the process is carried out is between about 15° and 30° C.

7. A process of claim 1 wherein said chloronitrate is 1-nitrato-1,2-dichloropropane, said Lewis acid is $SnCl_4$ which is used in at least about an equal molar amount to said chloronitrate, and the temperature at which the process is carried out is between about 15° and 30° C.

References Cited in the file of this patent

Boschan et al.: "J. Org. Chemistry," vol. 25, pages 2012-2015, 1960, QD 241 J 6.

UNITED STATES PATENT OFFICE
CERTIFICATE OF CORRECTION

Patent No. 3,164,612　　　　　　　　　　　　　　January 5, 1965

Walter Fink

It is hereby certified that error appears in the above numbered patent requiring correction and that the said Letters Patent should read as corrected below.

Column 1, lines 12 to 15, the formula should appear as shown below instead of as in the patent:

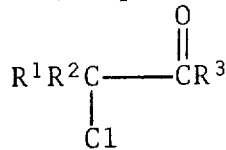

lines 22 and 23, for "preferabbly" read -- preferably --; column 2, line 60, for "frigenes" read -- frigones --.

Signed and sealed this 22nd day of June 1965.

(SEAL)
Attest:

ERNEST W. SWIDER　　　　　　　　　　　　EDWARD J. BRENNER
Attesting Officer　　　　　　　　　　　　　Commissioner of Patents